Dec. 12, 1933.  R. M. HESSERT  1,939,446
PHOTOGRAPHING APPARATUS
Filed July 8, 1930  8 Sheets-Sheet 4

Fig. 4.

WITNESS:

INVENTOR
Raymond M. Hessert
BY
HIS ATTORNEY

Dec. 12, 1933.                R. M. HESSERT                 1,939,446
                          PHOTOGRAPHING APPARATUS
                    Filed July 8, 1930        8 Sheets-Sheet 7

INVENTOR
Raymond M. Hessert
BY
HIS ATTORNEY

WITNESS:

Dec. 12, 1933.    R. M. HESSERT    1,939,446
PHOTOGRAPHING APPARATUS
Filed July 8, 1930    8 Sheets-Sheet 8

INVENTOR
Raymond M. Hessert
BY
Joshua R H Potts
HIS ATTORNEY

Patented Dec. 12, 1933

1,939,446

UNITED STATES PATENT OFFICE

1,939,446

PHOTOGRAPHING APPARATUS

Raymond M. Hessert, Philadelphia, Pa.

Application July 8, 1930. Serial No. 466,379

24 Claims. (Cl. 88—24)

This invention relates to a photographing apparatus and more particularly to an apparatus which automatically presents articles for photographing, operates the camera to photograph the article, operates to carry the article photographed from the focal range of the camera, and while presenting a new article to be photographed, operates the film mechanism of the camera so as to advance the same.

The object of the invention is to provide an improved document photographing machine.

A further object of the invention is to provide a machine into which documents are fed and by such feeding, the documents will set in motion a train of mechanism which includes the proper positioning of the document inserted, the shutter actuation for photographing the document, the removal of the document from the focal range and the presentation of another document and the simultaneous advancement of the continuous camera film; and the continuation of this cycle of operations so long as documents are intermittently fed into the document handling mechanism.

A further object of the invention is to provide improved mechanism for reversing a document in the focal range of the camera, so as to successively photograph both sides of the same.

A still further object of the invention is to provide novel means for reversing the document, insuring the positive location of the same in both front and rear positions in the focal range of the camera.

Still another object of the invention is to provide a mechanism which is operated entirely by the introduction of the document without the necessity of levers, push buttons or other actuating devices.

According to the invention, the document photographing machine comprises a camera and a document handling mechanism, the latter having a feed trough into which the documents are fed into the bight of a pair of rolls having aligned grooves around the circumference of the same, and across which fingers extend; these fingers are thrown aside by the document and such action is sufficient to set in motion the mechanism which propels the document through the machine.

After passing through the rolls the document falls substantially vertically against a reversing plate, while thin spring fingers hold the same securely against the same. In this position the camera is operated to photograph the front of the document. As another document is fed into the feed trough, the spring fingers are thrown aside and the reversing plate is snapped around, sub-scribing an arc of substantially 180°, the document being carried on the plate and thrown against a resilient pad on which there are arranged a plurality of pins which receive the document while the reversing plate is returned to its former position in time to receive the document which has subsequently been dropped into the feed slot.

The camera now operates so as to photograph the rear of the first document and the front of the succeeding one. Upon the next document being dropped into the feed slot, the first document is dropped onto a conveyor which carries the document to a magazine or stacking device, the second document is reversed onto the resilient pad and the third document rests upright against the reversing plate.

The mechanism of the document handling machine is so connected with the camera operating mechanism that the camera shutter is operated each time that the reverse side of one document and the front of another is presented in substantially stationary position, and after each operation of the shutter, the camera film is advanced so as to present a new frame for the next succeeding exposure.

The drawings illustrate an embodiment of the invention and the views therein are as follows.

Throughout the drawings like characteristics are used to indicate like parts.

Figure 1:
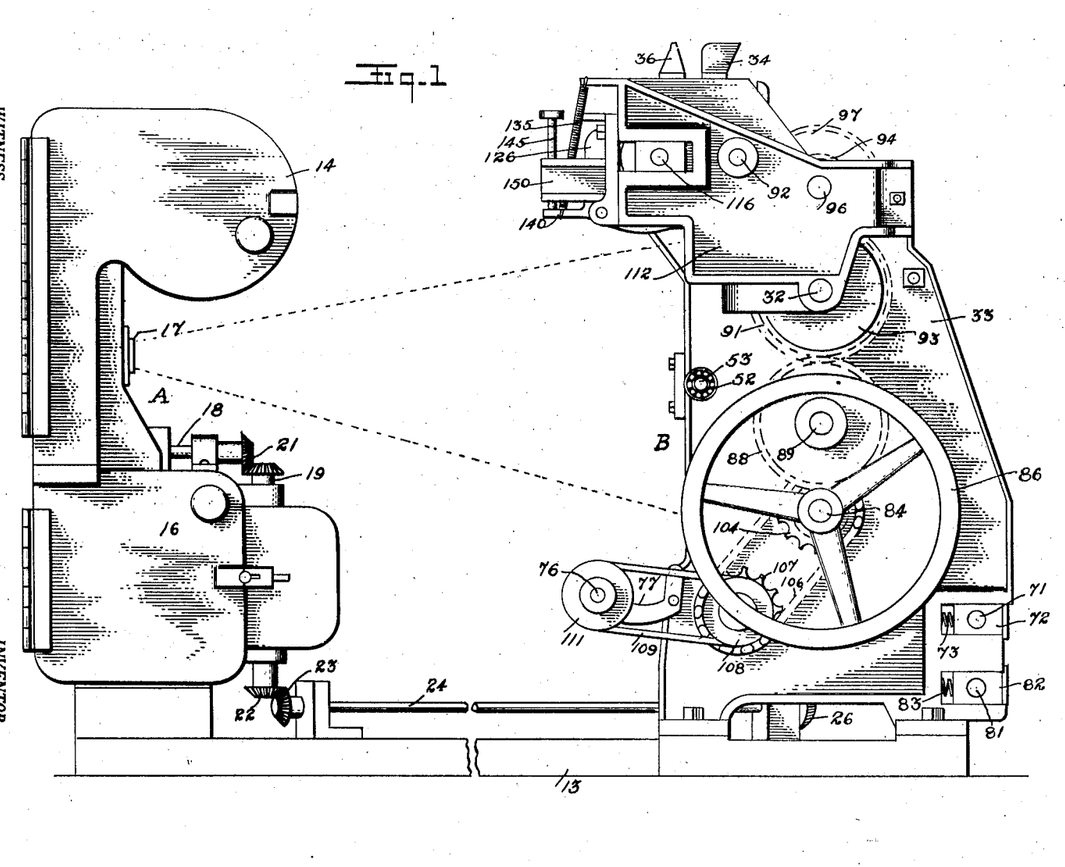
Figure 1 is a side elevation of the mechanism and shows the camera and document handling mechanism mounted in operative position.

Referring now to Figure 1, the camera A and the document handling mechanism B are mounted on the bed plate 13 and are so spaced that the front of one document and the rear of another document, in their stationary position on the document handling mechanism, may be included in the focal range of the camera.

The camera is of well-known design, having an upper magazine 14 and a lower magazine 16 for a continuous film which passes at the back of the lens 17 and between which said lens and film there is included the usual shutter (not shown).

The mechanism for operating the camera shutter and for advancing the photographic film consists of the shafts 18 and 19 operatively connected by bevel gears 21, and the lower end of the shaft 19 is provided with a bevel gear 22 which meshes with a bevel gear 23 on the outer end of a shaft 24 extending from the document positioning mechanism.

Figure 2:
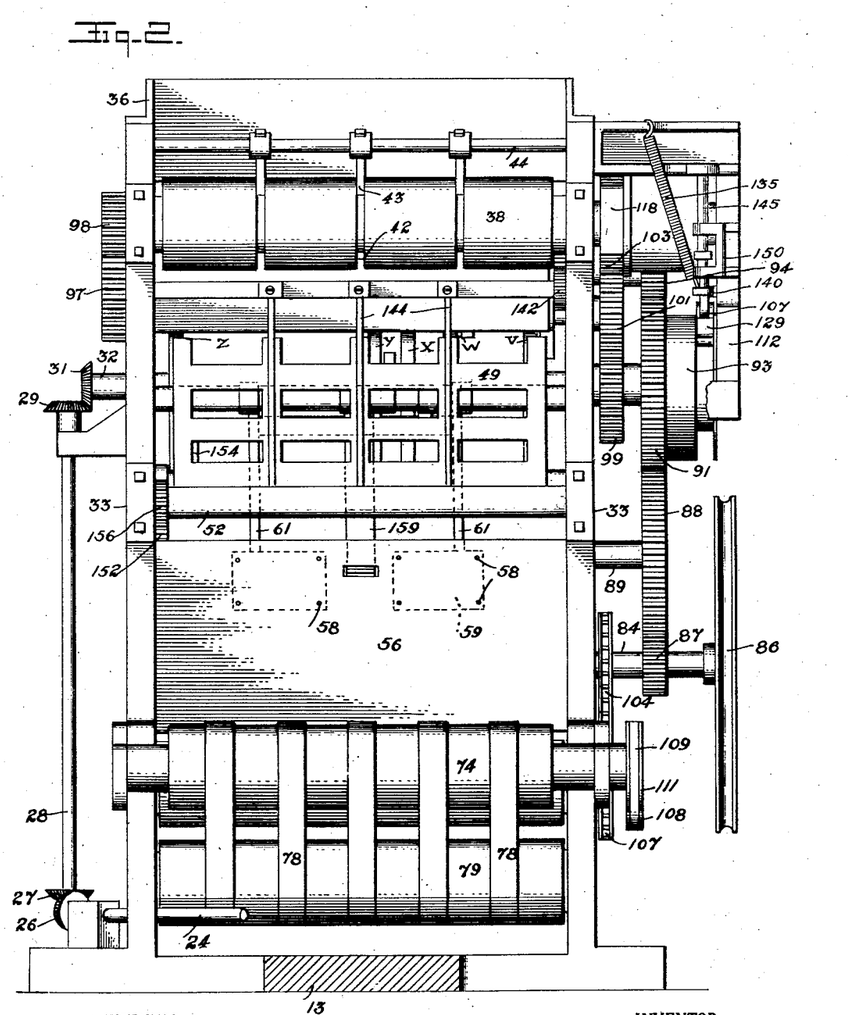
Figure 2 is a front elevation of the document handling mechanism with a small portion at the right hand side broken away to show the mesh of the gears.

This shaft 24 is provided at its other end with a bevel gear 26 meshing with a bevel gear 27 on the bottom of a vertical shaft 28 and which is provided at its upper end with a bevel gear 29 meshing with a vertical gear 31 on the outer end of the cam shaft 32 (see Figure 2).

The document handling mechanism is mounted on side frames 33. Extending between the frames and mounted on the top thereof are the parts 34 and 36 constituting the feed slot 37.

This feed slot 37 is directly above a pair of feed rollers 38 and 39, and said rollers are provided, respectively, with circumferential grooves 41 and 42, and a group of fingers 43 securely mounted on a rod 44 are adapted to pass through one side of the groove 41 in the roller 38 and have their ends extending into the groove 42 in the roller 39, thereby passing across the bight of said rollers.

A rod 46 extends between the frames and there is secured to said rod a plate 47 which has upwardly extending fingers 48 which terminate within the grooves 42 in the roller 39, so that a document when passing through the bight of the rollers 38 and 39 will be directed downward by the said fingers 48 and the plate 47, and prevented from following the contour of the roller 39. (See Figure 8.)

The reversing plate 49 comprises a grating 51 which extends substantially the entire distance between the side frames 33, and when in normal position, this grating is above a longitudinal hub 52 extending the full width of the said grating and provided on its ends with trunnions 53 which fit into ball bearings 54 mounted near the front of the side frames 33.

Immediately below the lower end of the reversing plate, when in its normal position, is the pad 56 which is formed of some shock-absorbing material, such for instance, as sponge rubber, mounted on a grating or rack 57 secured between the side frames 33.

This rack 57 and pad 56 are stationary and the pad is provided with a series of openings extending through the same and through which there is extended pins 58 which are mounted on plates 59, which said plates are mounted on the lower ends of brackets 61 securely fixed on the shaft 62.

The shaft 62 is provided with a metal plate 63 which extends substantially the entire length of the same between the side frames 33 and on the front of this metal plate there is secured a cushion or shock-absorber 64 in the nature of a sponge rubber pad.

This is to provide a cushioning for the grating of the reversing plate 49 when the same is returned to its normal position after reversing a document in the normal operation of the machine and will be hereinafter explained.

Beneath the pad 56 is a wooden roller 66 mounted on a shaft 67, and this roller is provided with a series of narrow belts 68 which extend over the periphery of a roller 69 mounted near the rear of the side frames 33.

The shaft 71 for this roller 69 is mounted in bearing blocks 72 which are provided with springs 73 for maintaining tension on the belts 68.

Another roller 74 has its shaft 76 mounted in brackets 77 secured to the side frames 33 and this roller is also provided with a plurality of narrow belts 78 which extend over the roller 79 mounted near the rear of the side frames 33.

The shaft 81 for this roller 79 is also mounted in bearing blocks 82 which are likewise provided with springs 83 for maintaining tension on the belts 78.

The mechanism is operated from the main shaft 84 and in the drawings I have shown this shaft as provided with a large grooved pulley 86 for receiving a belt which is connected to a motor (not shown), or other source of power.

The shaft 84 has a pinion 87 secured thereto and this pinion meshes with an idle gear 88 mounted on a shaft 89. This idle gear, in turn, meshes with a gear 91 which is rotatably mounted on a cam shaft 32 and has incorporated therewith a clutch 93 which, when operated, connects the cam shaft 32 to the gear 91, as will be later explained.

The gear 91 meshes with a small gear 94 on a shaft 96, while on the other end of this shaft 96 (see Figure 3), is a gear 97 which meshes with a pinion 98 on the shaft of the roller 39.

The cam shaft 32 also has a small gear 99 fixed to the gear 91 so as to be rotatable therewith on the said cam shaft, and this gear 99 meshes with a gear 101 on the shaft 62 and the latter gear meshes with a pinion 103 on the shaft of the roller 39.

The roller 38 is spring pressed against the roller 39, so that it rotates therewith through peripheral frictional engagement.

The main shaft 84 is also provided with a small sprocket 104 which is engaged by a chain 106 which passes over a sprocket 107 on the shaft 67, and said shaft is also provided with a pulley 108 on the outer end of said shaft 67, which is in turn provided with a belt 109 which extends over and operatively connects a pulley 111 on the outer end of the shaft 76, which is mounted in the bracket 77.

Figure 5:
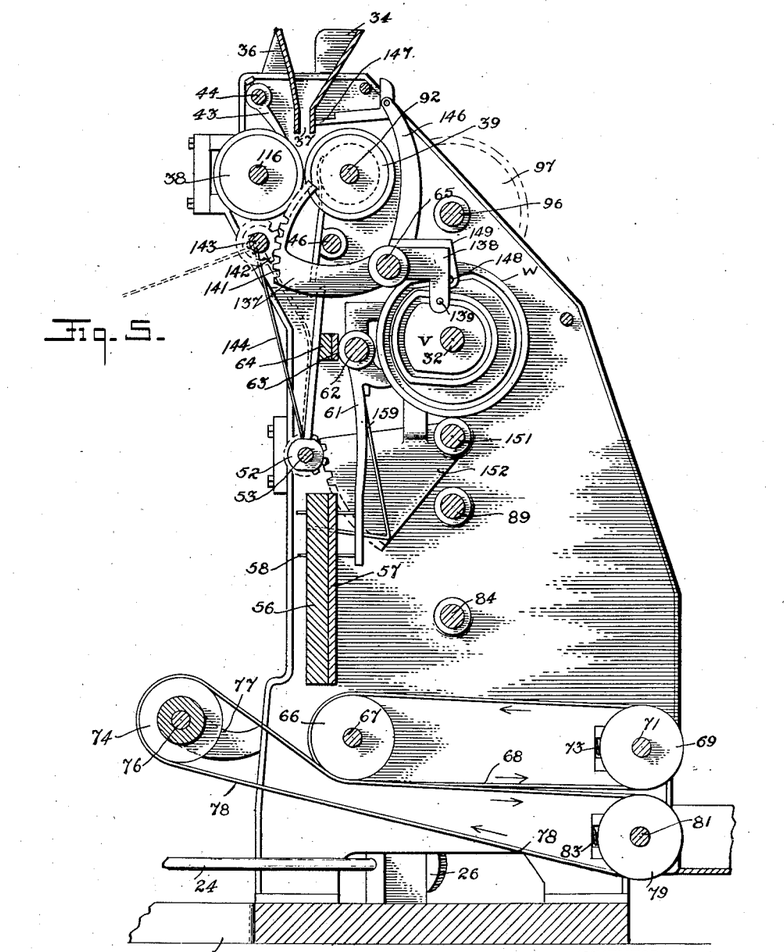
Figure 5 is a vertical sectional view on line 5—5 of Figure 3, looking in the direction of the arrows.

It will, therefore, be seen that when the pulley 86 is rotated, the belts will move in the direction shown by the arrows on Figure 5.

The document handling mechanism is provided with an auxiliary side frame or bracket 112 which supports the outer end of the shaft 92 on which the rear roller 39 is mounted, and on this same shaft and included between the side frame 33 and the auxiliary side frame 112, there is mounted a roll 113 which is faced with resilient material, such as rubber.

This roll is aligned with a roll 114 mounted on a small shaft 116, which said shaft has its bearings in the auxiliary side frame 112 and the side frame 33 to which said auxiliary frame is attached, and this shaft 116 is aligned with the shaft on which the front roller 38 is mounted.

Figure 9:
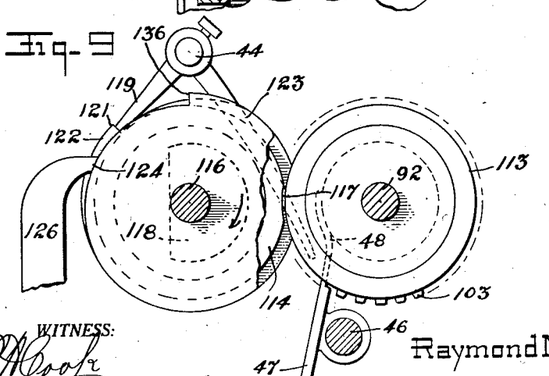
Figure 9 is a schematic view showing the relation of the parts which operate the several mechanism upon the introduction of the document into the feed slot.
Figure 11:
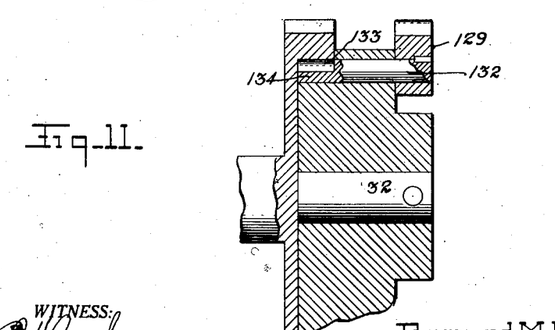
Figure 11 is a partial vertical sectional view of the clutch mechanism, taken on the line 11—11 of Figure 10.

The roll 114 is provided with an arcuate depression or cut-out portion 117 which extends the full length thereof, and which, when the clutch is in inoperative position, so as not to engage the gear 91 with the cam shaft 32, will face the roll 113 in the position such as shown in Figure 9, so that the roll 113, being mounted as it is on the shaft 92 which operates at all times when the main shaft 84 is rotated, may roll free of the roll 114.

On the shaft 116 there is mounted a weight 118 which has a tendency to revolve the shaft 116 and the roll 114 in the direction shown by the arrow on Figure 9, the weight, however, being restrained from causing said operation by virtue of a finger 119 mounted on the rod 44, which said rod, it will be remembered, carries the fingers 43 which lie in the circumferential grooves 41 in the roller 38 and extend across the bight of that roller with the roller 39.

This finger 119 engages by its end with a tooth 121 on a cam disc 122 mounted securely with the roll 114 and the weight 118 on the shaft 116.

When, however, the finger 119 is raised from its engagement with the teeth 121, it will be readily seen that the weight 118 will cause the roll 114 and the shaft 116 to rotate in the direction of the arrow, shown in Figure 9, and, therefore, the peripheries of the rolls 114 and 113 will be engaged and the roll 114 rotated thereby.

There is, however, another cam disc 123 fixed to the roll 114 on the side opposite to the cam disc 122 and this disc has a reduced peripheral portion 124 which is engaged by the finger 126 of a clutch operating lever 127 which is pivotallly mounted on the auxiliary side frame 112 at the point 128.

Figure 3:
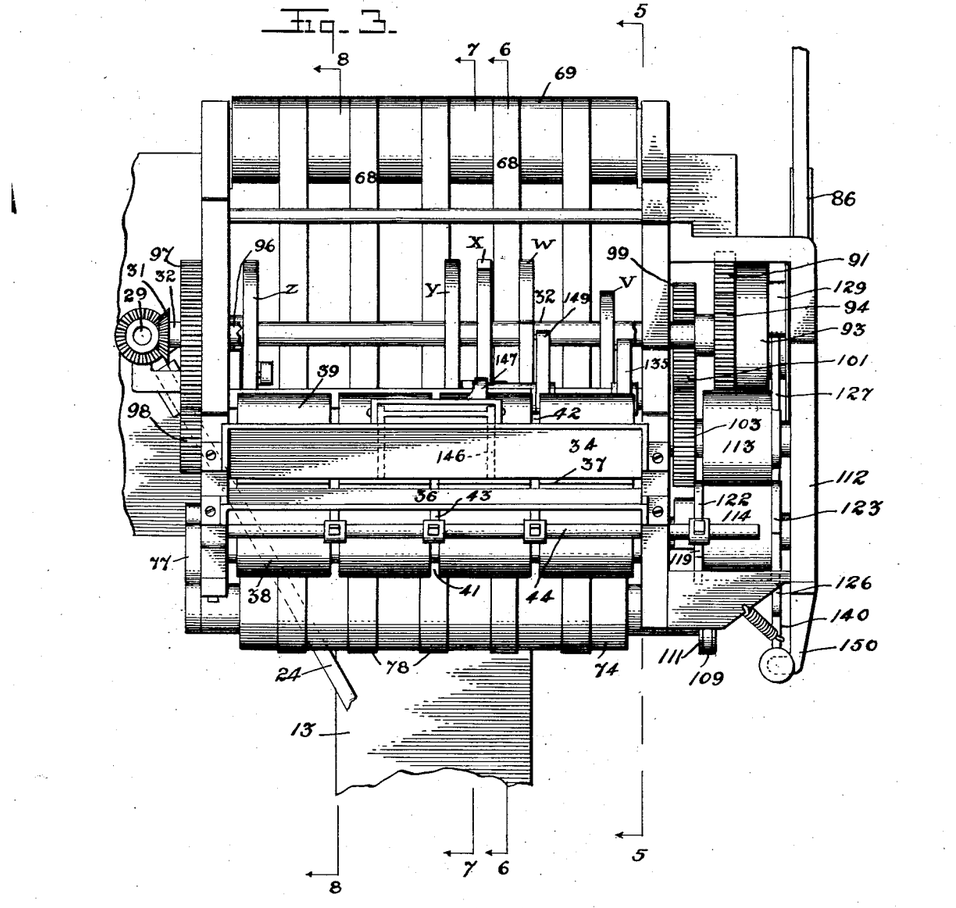
Figure 3 is a top plan view of the document handling device.
Figure 4:
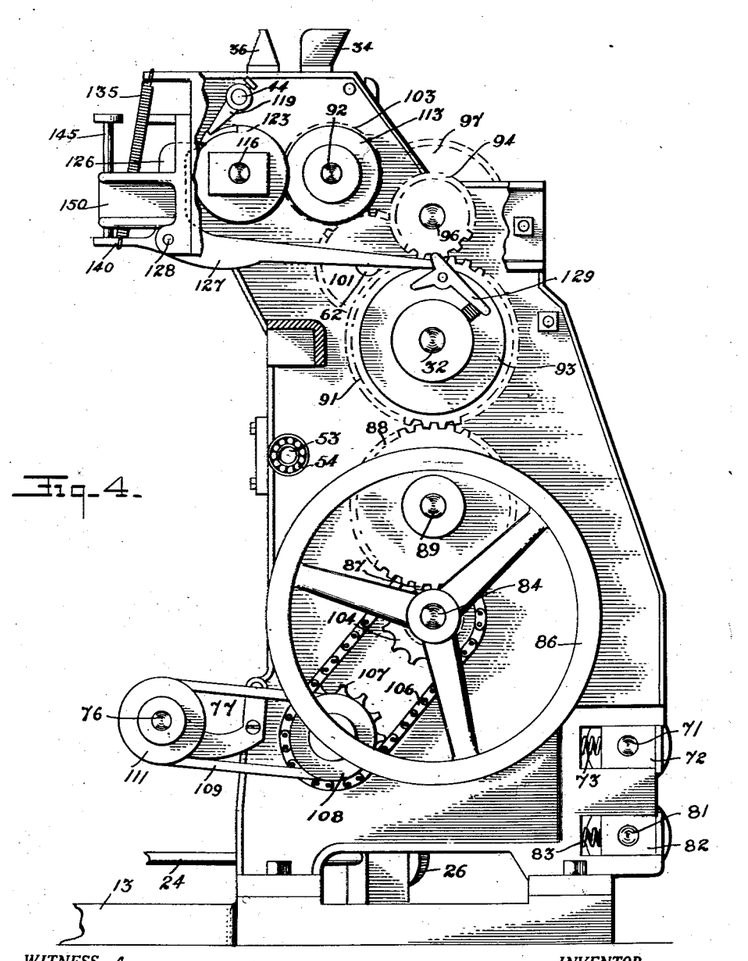
Figure 4 is a side elevation with a part of the upper and outer casting broken away.
Figures 7, 10:
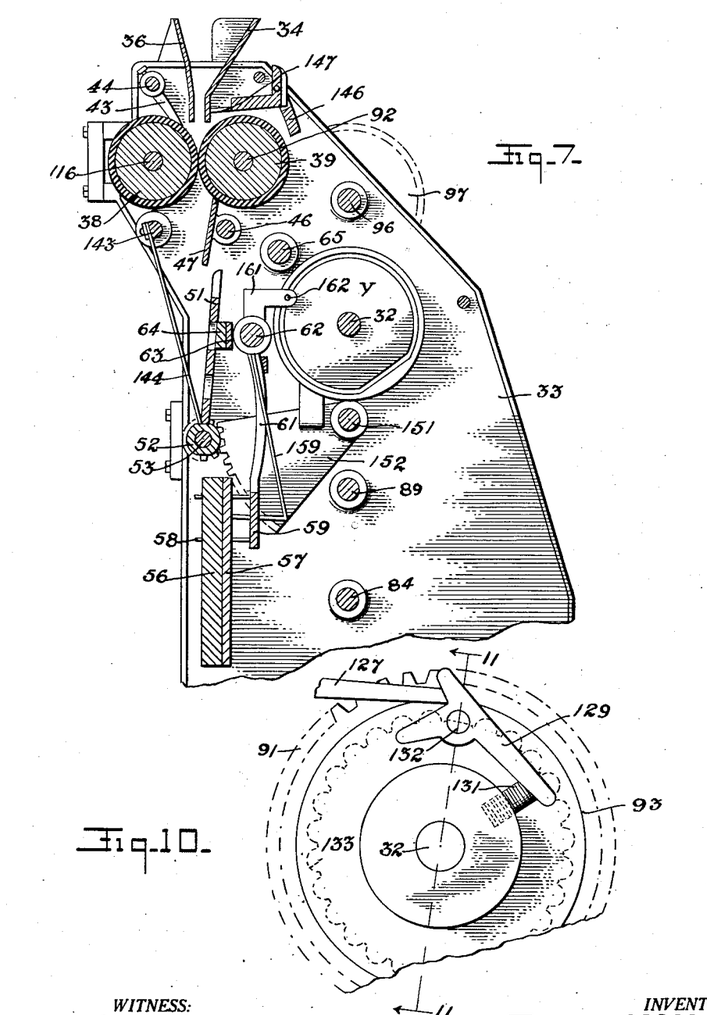
Figure 7 is a like view taken along a line indicated by the line 7—7 of Figure 3, looking in the direction of the arrows.
Figure 10 is a face view of the clutch mechanism and operating lever partly broken away.

It will be seen that by reference to Figures 3 and 10, that this clutch operating lever 127 has its outer end engaging the dog 129 on the clutch 93, and the clutch has an arm which is urged outward by a spring 131 so as to cause the dog to operate a clutch engaging pin 132 when the lever 127 is raised from engagement with the dog 129.

This pin 132, where it engages the serrated face 133 of the interior of the clutch, is reduced to half section, as shown at 134, and when the dog 129 is in the position such as shown in Figure 10, the exterior of the clutch 93 containing the serrations 133 will pass over the pin 132, but when the same is freed from the lever 127 and raised outwardly by the dog 129, the reduced portion 134 will engage the serrations 133 and tie the gear 91 to the cam shaft 32, thereby causing the shaft to rotate with the clutch and with the gear 91.

It will be seen, by reference to Figures 3 and 9, that when the roll 114 is engaged with the roll 113 by the raising of the finger 119 and the movement of said roll and discs 122 and 123 in the direction of the arrow in Figure 9, that upon the continued rotation of said rolls 113 and 114, the finger 126 will be pressed outward, thereby raising the clutch operating lever 127 (see Figure 10), from its engagement with the dog 129, whereupon the spring 131 will rotate the dog on the pin 132 and the reduced part of the pin will engage the nearest serration 133, and therefore the clutch and gear 91 will be tied to the cam shaft 32 and on account of said gear being in mesh with the gear 87 on the main shaft 84, the cam shaft 32 will be rotated.

However, this actuation of the cam shaft 32 and its attendant mechanisms is only possible for one revolution without a resetting of the machine, and the operating parts, because when the cam disc 123 has completed approximately three quarters of its revolution, the finger 126 will fall over the shoulder 136, formed between the concentric peripheral part of the said disc and the reduced peripheral portion 124 and be drawn onto the reduced part by means of the spring 135 and, therefore, the end of the cam operating lever 127 will be drawn back to its original position and as the clutch 93 continues to rotate, the dog 129 will be engaged by the end of said lever and will be pivotally operated, so as to depress the spring 131 and release the reduced portion 134 of the pin 132 from the serration 133, and thereafter and until the machine is again set, the gear 91 and the external part of the clutch 93 may rotate freely without driving the cam shaft 32.

The spring 135 is fastened to an extension arm 140 on said cam operating lever 127 and a pin 145 is mounted in an extension 150 on the auxiliary side frame 112 with its bottom resting against said arm, so that the clutch may be operated manually by depressing said pin.

The cam shaft 32 is provided with five cams, all mounted on the said shaft between the side frames 33. These cams, reading from right to left in Figure 3, are characterized by the letters V, W, X, Y and Z. The mechanism which is operated by the cams V and W, respectively, is shown in Figure 5.

The timing of these cams will be omitted until the operation of the machine is explained.

A bracket 137 is loosely mounted on the shaft 65. This bracket has an overhanging portion 138 which is provided with a pin 139 which extends into the cam race on the cam V. The outer end of the bracket is provided with a toothed segment 141 which meshes with a pinion 142 on a shaft 143, which carries a series of thin spring fingers 144.

The cam V is so constructed that when a document rests against the grating 51 of the reversing plate 49 and at photographing time the spring fingers 144 will be bent back to securely hold the same, such as shown by the dotted lines in Figure 5, and when the said reversing plate 49 is about to operate, the fingers are thrown to the upper position, such as shown by the dotted lines.

There is also loosely mounted on the shaft 65 a bracket 146 which carries on its upper end a pair of fingers 147 which, when the cam shaft 32 is in operation, will be moved by the cam W through the medium of the pin 148 in the extension 149 on said bracket across the feed slot 37, and thus prevent the admission of any document to the document positioning mechanism until after the cam shaft 32 has completed its single revolution operation.

The cam Z is for the purpose of operating the reversing plate 49. The mechanism for operating this part is clearly shown in Figure 8. Fixed on a shaft 151 is a segmental gear 152 which has an extension 153 having a pin 154 which operates in the cam race of the cam Z. This segmental gear meshes with a pinion 156 which is secured on one of the trunnions 53 of the longitudinal hub 52 of the reversing plate 49.

The cam race is so constructed that at a certain interval in its rotation and after the spring fingers 144 have been raised to the upper dotted line position, as shown in Figure 5, the plate will be quickly snapped around so as to throw the document which rests against the grating 51 thereof completely around in an arc of approximately 180° and impinge the same against the pad 56 where the pins 58 on the plates 59 will pierce the document and hold the same securely on said pad 56.

Figure 8:
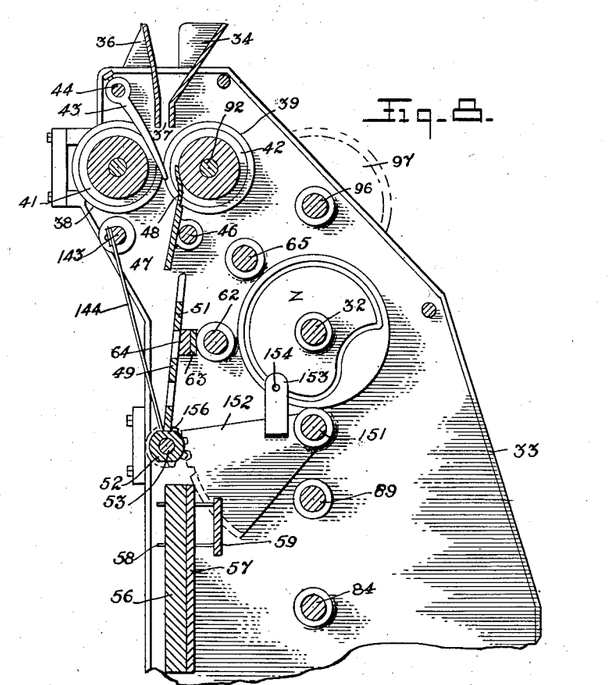
Figure 8 is a like view taken along a line indicated by the line 8—8 of Figure 3, and looking in the direction of the arrows.

The cam race is so constructed that immediately the document is driven against the pad 56 it will return to its upright position, such as shown in Figure 8.

Figure 6:
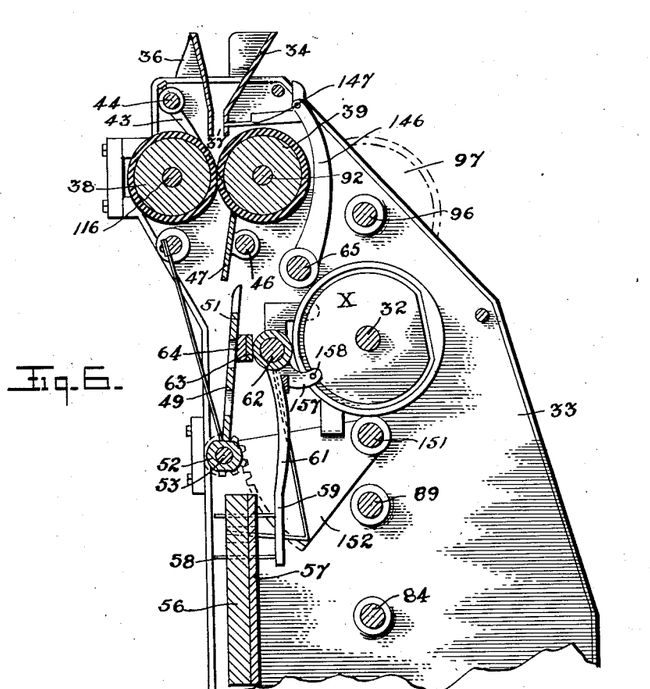
Figure 6 is a partial vertical section and is taken at a line indicated by the line 6—6 of Figure 3, looking in the direction of the arrows.

Referring now to Figure 6, the bracket 61 which is loosely mounted on the shaft 62 and which, at its lower end carries the pins 58 on the plates 59, has an extension 156 which extends into the cam race onto said cam X. During the greater portion of the revolution of the cam shaft 32 the pins 58 are extended outward from the front of the pad 56, as shown in said view, but during a cycle of operation, the pins are withdrawn to the rear of the face of the pad, so as to permit the document formerly held thereby, to fall upon the belt 79 and pass between the belts 78 and 68 and, therefore, be passed along by said belts to any convenient stacking member (not shown).

Figure 7 illustrates the operation of the kick-off finger 159 which is located at and extends through the upper central part of the pad 56, and is normally held back beyond the face thereof.

This finger is operated by means of an extension 161 which has a pin 162 which follows the cam race in the cam Y and is so timed that when the pins 58 are withdrawn into the pad 56, the substantially horizontal part of the kick-off finger 159 will be snapped through the pad 56 and will insure the removal of the document from the said pad 56 and pins.

The operation of the complete apparatus is as follows: The documents to be photographed are fed into the feed slot 37. Every individual document falls into the bight of the rollers 38 and 39, and as the same is drawn downward, the fingers 43 on the rod 44 are thrown forward, thereby raising the finger 119 from its engagement with the tooth 121 on the cam disc 122, which will permit the weight 118 to revolve the roll 114 so that it will engage the roll 113, while the cam disc 123, in its rotation, will press the finger 126 outward, thereby raising the cam operating lever 127 and operating the dog 129 of the clutch 93 so as to engage the cam shaft 32 with the gear 91 which is operating.

As the document passes through the rollers 38 and 39, it will be prevented from curling or following the contour of the roller 39 by the plate 47 and will be directed down against the spring fingers 114 and between said fingers and the grating 51 of the reversing plate 49.

At this precise moment the cam V will operate the bracket 137 so as to rotate the pinion 142 on the shaft 143 through the medium of the gear segment 141 on said bracket, and thereby the fingers 144 will be pressed back against the grating 51 of the reversing plate 49 and into the position such as shown by dotted lines in Figure 5.

At this precise moment the cam shaft 32 will operate the shafts 28, 24, 19 and 18, so as to operate the shutter (not shown) of the camera A, and thereby photograph the document in its position against the reversing plate 49.

There is, of course, only a moment's hesitation for the document in this position and during the succeeding operation the continuous film in the camera is operated through the same shafts just mentioned, so as to draw the exposed portion of the film away from the lens and place a new frame in alignment therewith for the next exposure.

The cam V now operates to move the spring fingers 144 into the upper dotted line position, such as shown in Figure 5, and immediately thereafter the cam Z operates the segmental gear 152 which meshes with the pinion 156 so that the reversing plate 49 is speedily snapped around in an arc of approximately 180° and the document on the grating 51 of said reversing plate 49 is thrown somewhat forcibly against the pad 56, where it will be held thereagainst by means of the pins 58 which pierce the same.

Up to this point there has been but a single document in the machine and when the second document is dropped into the feed slot 37, it will assume its position against the reversing plate 49 and the spring fingers 144 will operate to press the same thereagainst as formerly described, and when in this position the camera will be again operated so as to photograph the back of the first document and the front of the succeeding document.

Immediately after the camera operated cam X will operate the bracket 61 so as to withdraw the pins 58 from in front of the pad 56, while at this precise moment the cam Y will operate the kick-off finger 159 so as to insure the removal of the document from the pad 56, whereupon the document will fall between the belts 78 and 68 and be carried to a proper means for stacking the same in sequential order.

When the document falls from the pad 56, the spring fingers 144 will be again raised and the reversing plate 49 again rotated so as to place the second document in reversed position, after which the reversing plate will again be raised in a position to receive the succeeding document.

Of course, during the operation of the machine the bracket 146 will be operated so as to extend the fingers 147 across the feed slot, which prevents the introduction of successive documents until the machine has operated to the proper point where they are admissible.

The shafts and rollers of the machine are, where desirable, placed in spring urged bearing blocks which is all a matter of detail and which has been deemed unnecessary to describe in connection with this mechanism.

The entire machine, as described, is also mounted in a suitable cabinet with lights focused on the documents as they pass through the mechanism, which is all a matter of detail and is merely mentioned in connection with the mechanism.

While it is understood that machines for photographing the face only of documents are shown in the prior art, and while mechanisms for photographing both the front and back of documents have been proposed, in which connection may be classed my co-pending application, Serial No. 315,387, filed October 27, 1928, the present invention has many advantages over any of these former structures, and has proved commercially acceptable to business houses finding need for such a machine.

Of course, the document photographing apparatus illustrated herein may be modified in various ways without departing from the invention herein set forth and hereafter claimed.

The invention is hereby claimed as follows:

1. A document photographing machine including document handling mechanism comprising feed rolls, means for positioning a document for photographing, means for operating said first means to reverse said document for photographing the reverse side, and means comprising impaling pins for holding said document in reversed position.

2. A document photographing machine including document handling mechanism comprising feed rolls, means for positioning a document for photographing, means for operating said first means to reverse said document for photographing the reverse side, and means comprising impaling pins for holding said document in reversed position, said pins being retractable to discharge the document from the focal range of the camera.

3. A document photographing machine including document handling mechanism comprising feed rolls, means for positioning a document for photographing, means for operating said first means to reverse said document for photographing the reverse side, means comprising impaling pins for holding said document in reversed position, and means for discharging said document from the focal range of the camera.

4. In a device for photographing a document, a support, spring fingers for securely holding the document on said support during photographing, means for releasing said fingers during positioning and discharging of said document, and mechanism for operating said means in timed relation with photographing means.

5. In a device for photographing both sides of a document, spring fingers for securely holding the document during the photographing of one side thereof, means for releasing said fingers to admit the document to photographing position and to raise the same to permit reversal of the document, and means timed with said last means for reversing said document.

6. In a device for photographing both sides of a document, spring fingers for securely holding the document during the photographing of one side thereof, means for releasing said fingers during the reception and reversal of said document, and means timed with said last means for reversing said document.

7. In a device for photographing documents, a support for the document to be photographed, impaling pins extending from said support for puncturing said document against said support to impale same on said pins, means for retracting the pins to release the document, and means for pushing the document from said support.

8. In a device for photographing documents, a support for the document to be photographed, impaling pins extending from said support, means for slapping said document against said support to impale the same on said pins, and means for retracting the pins to release the document.

9. In a device for photographing documents, a support for the document to be photographed, impaling pins extending from said support, means for slapping the said document against said support to impale same on said pins, means for retracting the pins to release the document, and means for discharging and stacking documents in sequential order.

10. In a device for photographing documents, a support for the document to be photographed, impaling pins extending from said support, means for slapping the said document against said support to impale same on said pins, means for retracting the pins to release the document, means for releasing the impaled document, and means for discharging and stacking documents in sequential order.

11. A document handling device comprising feed rolls, means associated with said rolls and actuated by the insertion of a document to set in motion mechanism comprising means to hold the document in position to be photographed, means for reversing the document, means to hold said document in position to have its reverse side photographed, and means to sequentially stack documents passing through the device.

12. A document handling device comprising document feed means, a support onto which the document falls by gravity for photographing, means for reversing the document, retractable means for holding the document for photographing the reverse side, means for removing the document from the last means, and means onto which the document falls by gravity to remove the same from the device.

13. In a document handling device, feed rolls, a reversing plate, a lower resilient support, pins extending from said support, and means to operate said reversing plate to impale documents on said pins and against said support.

14. In a document handling device, feed rolls, a reversing plate, a lower resilient support, pins extending from said support, means to operate said reversing plate to impale documents on said pins and against said support, and means for discharging said document.

15. In a document handling device, feed rolls, a reversing plate, a lower resilient support, pins extending from said support, means to operate said reversing plate to impale documents on said pins and against said support, and means for retracting said pins to discharge said document.

16. In a document handling device, feed rolls, a reversing plate, a lower resilient support, pins extending from said support, means to operate said reversing plate to impale documents on said pins and against said support, means for retracting said pins, and means for pushing said document from said support.

17. In a device for photographing documents comprising a camera and a document handling device, feed rolls for dropping a document against a reversing plate, mechanical means to securely hold said document against said plate during photographing, means to swing aside said first means, means to operate said reversing plate, a support, means to receive the document from the reversing plate and hold same against said support, and means to release said last means to discharge said document.

18. In a device for photographing documents comprising a camera and a document handling device, feed rolls for dropping a document against a reversing plate, spring fingers operable to securely hold said document against said plate during photographing, means to swing aside said fingers, means to operate said reversing plate, a support, means to receive the document from the reversing plate and hold same against said support, and means to release said last means to discharge said document.

19. In a device for photographing documents comprising a camera and a document handling device, feed rolls for dropping a document against a reversing plate, means to securely hold said document against said plate during photographing, means to swing aside said first means, means to operate said reversing plate, a support, pins to receive the document from the reversing plate and hold same against said support, and means to release said pins to discharge said document.

20. In a device for photographing documents comprising a camera and a document handling device, feed rolls for dropping a document against a reversing plate, spring fingers to securely hold said document against said plate during photographing, means to swing aside said fingers, means to operate said reversing plate, a support, pins to receive the document from the reversing plate and hold same against said support, and means to release said pins to discharge said document.

21. In a device for photographing documents comprising a camera and a document handling device, feed rolls for dropping a document against a reversing plate, mechanical means to securely hold said document against said plate during photographing, means to swing aside said first means, means to operate said reversing plate, a support, means to receive the document from the reversing plate and hold same against said support, means to release said last means to discharge said document, and means to convey documents from the device and stack same.

22. In a device for photographing documents comprising a camera and a document handling device, feed rolls for dropping a document against a reversing plate, spring fingers operable to securely hold said document against said plate during photographing, means to swing aside said fingers, means to operate said reversing plate, a support, means to receive the document from the reversing plate and hold same against said support, means to release said last means to discharge said document, and means to convey documents from the device and stack same.

23. In a device for photographing documents comprising a camera and a document handling device, feed rolls for dropping a document against a reversing plate, means to securely hold said document against said plate during photographing, means to swing aside said first means, means to operate said reversing plate, a support, pins to receive the document from the reversing plate and hold same against said support, means to release said pins to discharge said document, and means to convey documents from the device and stack same.

24. In a device for photographing documents comprising a camera and a document handling device, feed rolls for dropping a document against a reversing plate, spring fingers to securely hold said document against said plate during photographing, means to swing aside said fingers, means to operate said reversing plate, a support, pins to receive the document from the reversing plate and hold same against said support, means to release said pins to discharge said document, and means to convey documents from the device and stack same.

RAYMOND M. HESSERT.